United States Patent
Fukui et al.

(10) Patent No.: US 8,216,720 B2
(45) Date of Patent: *Jul. 10, 2012

(54) NEGATIVE ELECTRODE FOR LITHIUM SECONDARY CELL AND LITHIUM SECONDARY CELL

(75) Inventors: Atsushi Fukui, Tokushima (JP); Yasuyuki Kusumoto, Kobe (JP); Mariko Torimae, Kobe (JP); Hiroshi Nakamura, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 82 days.

This patent is subject to a terminal disclaimer.

(21) Appl. No.: 10/519,073

(22) PCT Filed: Jun. 25, 2003

(86) PCT No.: PCT/JP03/08024
§ 371 (c)(1),
(2), (4) Date: Dec. 23, 2004

(87) PCT Pub. No.: WO2004/004031
PCT Pub. Date: Jan. 8, 2004

(65) Prior Publication Data
US 2005/0244711 A1  Nov. 3, 2005

(30) Foreign Application Priority Data
Jun. 26, 2002 (JP) .................... 2002-185532

(51) Int. Cl.
*H01M 4/13* (2006.01)
*H01M 4/88* (2006.01)

(52) U.S. Cl. ............ 429/231.1; 429/209; 429/218.1; 252/182.1

(58) Field of Classification Search .......... 429/212
See application file for complete search history.

(56) References Cited

U.S. PATENT DOCUMENTS

| 4,927,514 | A * | 5/1990 | Solomon et al. ........... 204/242 |
| 5,468,571 | A * | 11/1995 | Fujimoto et al. ........... 429/217 |
| 6,432,579 | B1 * | 8/2002 | Tsuji et al. .............. 429/218.1 |
| 2002/0094480 | A1* | 7/2002 | Gan et al. ................ 429/212 |

(Continued)

FOREIGN PATENT DOCUMENTS
AP  2000-012088  * 1/2000
(Continued)

OTHER PUBLICATIONS
www.scientificpolymer.com.*
(Continued)

*Primary Examiner* — Cynthia Lee
(74) *Attorney, Agent, or Firm* — Kubovcik & Kubovcik (57) ABSTRACT

A negative electrode for a lithium secondary cell having a collector composed of an electroconductive metal foil and, provided on the surface thereof, an active material layer containing active material particles containing silicon and/or a silicon alloy and a binder, characterized in that the binder has mechanical characteristics of a tensile strength of 50 N/mm$^2$ or more, an elongation at break of 10% or more, a strain energy density of $2.5 \times 10^{-3}$ J/mm$^3$ or more and a coefficient of elasticity of 10000 N/mm$^2$ or less, and preferably characterized in that the collector has mechanical characteristics of a tensile strength of 80 N/mm$^2$ or more, a proportional limit 30 N/mm$^2$ or more, an elongation at break of 1.0% or more and an elastic elongation limit of 0.03% or more.

13 Claims, 1 Drawing Sheet

U.S. PATENT DOCUMENTS

2004/0043294 A1* 3/2004 Fukui et al. .................. 429/235

FOREIGN PATENT DOCUMENTS

| JP | 07-188428 A | 7/1995 |
| JP | 09-115523 A | 5/1997 |
| JP | 11-21455 A | 1/1999 |
| JP | 11-111300 A | 4/1999 |
| JP | 2000-12088 A | 1/2000 |
| JP | 2000-215897 A | 8/2000 |
| JP | 2002-83594 A | 3/2002 |
| JP | 2003-7305 A | 1/2003 |
| WO | 01/31723 A | 5/2001 |
| WO | 02/21616 A1 | 3/2002 |

OTHER PUBLICATIONS

The glass transition point and melting point of polytetrafluoroethylene, retrieved from the Internet www.scientificpolymer.com/catalog/description.asp?QproductCode=203 on Mar. 23, 2007.*

Office Action issued Feb. 3, 2012, in Chinese patent application No. 03814951.6 and English translation thereof.

* cited by examiner

NEGATIVE ELECTRODE FOR LITHIUM SECONDARY CELL AND LITHIUM SECONDARY CELL

This application is a 371 of international application PCT/JP03/08024, which claims priority based on Japanese patent application No. 2002-185532 filed Jun. 26, 2002, which is incorporated herein by reference.

TECHNICAL FIELD

The present invention relates to a negative electrode for a rechargeable lithium battery and also to a rechargeable lithium battery using the same.

BACKGROUND ART

As one of new types of high-power and high-energy density rechargeable batteries, a rechargeable lithium battery has been recently utilized which is charged and discharged by the transfer of lithium ions through a nonaqueous electrolyte solution between the positive and negative electrodes.

For such a rechargeable lithium battery, a negative electrode has been proposed which comprises silicon-containing active material adhered by a binder onto a current collector having an average roughness of at least 0.03 μm (Japanese Patent Laying-Open No. 2000-12088).

It is however known that the silicon-containing active material is powdered or delaminated from the current collector during charge and discharge because the silicon-containing active material expands and shrinks in volume when it stores and releases lithium. This lowers the current-collecting capacity and accordingly deteriorates charge-discharge cycle performance characteristics, which has been a problem.

DISCLOSURE OF THE INVENTION

It is an object of the present invention to provide a negative electrode for a rechargeable lithium battery, which can restrain flaking off of an active material layer from a current collector during charge and discharge and thereby improve charge-discharge cycle characteristics, as well as providing a rechargeable lithium battery utilizing the same.

The negative electrode for a rechargeable lithium battery, in accordance with the present invention, has an active material layer provided on a surface of a current collector composed of an electrically conductive metal foil. The active material layer includes particles of silicon- or silicon alloy-containing active material and a binder. Characteristically, the binder has mechanical properties of at least 50 N/mm$^2$ tensile strength, at least 10% elongation at break, at least $2.5 \times 10^{-3}$ J/mm$^3$ strain energy density and up to 10,000 N/mm$^2$ elastic modulus.

In the present invention, the current collector preferably has mechanical properties of at least 80 N/mm$^2$ tensile strength, at least 30 N/mm$^2$ proportional limit, at least 1.0% elongation at break and at least 0.03% elastic elongation limit.

The elastic elongation limit, as used herein, refers to a strain at the proportional limit.

In the present invention, the current collector and binder possess the above-specified respective mechanical properties at the point when fabrication of the negative electrode is completed. Provided that the current collector and binder have the above-specified mechanical properties, the active material layer is restrained from flaking off from the current collector, even if the active material layer expands and shrinks in volume as it stores and releases lithium, and thus suppresses reduction of a current-collecting capacity within the electrode. Accordingly, improved charge-discharge cycle characteristics result.

Because the current collector of the present invention possesses the above-specified mechanical properties, it can accommodate a high stress, if applied thereto, within a range of elastic deformation. This restrains the current collector from being deformed, such as wrinkled, even when it is subjected to a large force arising from volumetric expansion and shrinkage of the active material layer. Production of deformation, e.g. formation of wrinkles, in the current collector increases the occurrence of flaking off of the active material layer from the current collector. In the present invention, because the current collector is hardly wrinkled or deformed, the active material layer is restrained from flaking off from the current collector.

In the present invention, the binder possessing the above-specified mechanical properties can also accommodate a high stress, if applied thereto as a result of volumetric expansion and shrinkage of the active material particles, within a range of elastic deformation. This prevents breakage of the binder even if the active material particles expand and shrink in volume during a charge-discharge reaction, suppresses increase of contact resistance between the active material particles, restrains flaking off of the active material layer from the current collector. As a result, the reduction of a current-collecting capacity within the electrode is suppressed to improve charge-discharge cycle characteristics.

The above-specified mechanical properties, respectively for the current collector and the binder, are given values measured at 25° C. Those mechanical properties can be measured as by using an Instron Model-5566 universal tester.

The tensile strength of the binder is more preferably at least 100 N/mm$^2$, particularly preferably at least 500 N/mm$^2$. The elongation at break of the binder is more preferably at least 50%, particularly preferably at least 100%. The strain energy density of the binder is more preferably at least $5 \times 10^{-3}$ J/mm$^3$. The tensile strength and elongation at break can be given by the strain and elongation values recorded at the time when a sample was broken on a tensile test. Therefore, the higher the tensile strength and elongation at break are, the binder can relax a higher stress. The strain energy density can be given by an area below a stress-strain curve on a tensile test. Therefore, the higher the strain energy density is, the binder can absorb a higher energy before it is broken.

In the present invention, the elastic modulus of the binder does not exceed 10,000 N/mm$^2$, as stated above. More preferably, it does not exceed 7,000 N/mm$^2$. If the elastic modulus of the binder is excessively high, it becomes difficult for the binder to relax a stress produced when the active material particles expand and shrink in volume, resulting in the reduced current-collecting capacity within the electrode.

Because the current collector in the present invention comprises an electrically conductive metal foil, its mechanical properties can be varied by a heat treatment. A negative electrode can be fabricated by providing the active material layer on a surface of the current collector and then carrying out a sintering treatment which forms coherent bonds between active material particles in the active material layer and coherently bonds the active material particles to the current collector. In such a case, the above-specified mechanical properties may be imparted to the current collector by a thermal history of the sintering treatment. That is, the sintering treatment may be carried out in such a way to impart the above-specified properties to the current collector. It is difficult to measure mechanical properties of the current collector after the sintering treatment, because it then carries the active material layer thereon to constitute the negative electrode. Instead, the current collector before the sintering treatment can be separately subjected to the same heat treatment as the sintering treatment and then measured to determine such mechanical properties.

In the present invention, mechanical properties of the binder can be determined by measuring a sample film prepared from the binder. In the preceding case where the sintering treatment is utilized to fabricate a negative electrode, the sample film is subjected to the same heat treatment as the sintering treatment and then measured to determine mechanical properties of the binder after the sintering treatment.

In the negative electrode fabrication, there may be cases where the sintering treatment is not carried out or the sintering treatment alone is not sufficient to impart desired mechanical properties to the current collector. In such cases, the current collector, prior to being provided on a surface of the active material layer, may be subjected to a heat treatment to thereby impart desired mechanical properties to the current collector. In this case, mechanical properties of the current collector can be directly measured by testing of the heat-treated current collector.

In this invention, the sintering treatment temperature is preferably 200-500° C., more preferably 300-450° C. Also in this invention, the heat treatment temperature of the current collector is preferably up to 500° C., more preferably up to 400° C. Preferably, the above-described sintering treatment and heat treatment are both carried out under a non-oxidizing atmosphere. Examples of non-oxidizing atmospheres include argon and other inert gas atmospheres, a nitrogen gas atmosphere and a vacuum atmosphere. Other examples include reducing atmospheres such as a hydrogen atmosphere. Preferred among them are argon and other inert gas atmospheres. A spark plasma sintering or hot pressing technique can be utilized to accomplish the sintering treatment.

In this invention, the sintering treatment of the negative electrode may be carried out such that an element present in the current collector diffuses into active material particles in the active material layer. In a particular case where a current collector surface contains a copper element, the diffusion of the copper element into the active material particles improves adhesion of the active material layer to the current collector.

In this invention, the current collector suffices so long as it possesses the above-specified mechanical properties. Therefore, the current collector having the above-specified mechanical properties can be used without the need of being subjected to the sintering or heat treatment.

In this invention, the thickness X of the active material layer, the thickness Y of the current collector and its surface roughness Ra, i.e., an arithmetic mean roughness Ra, preferably satisfy the relationships $5Y \geqq X$ and $250Ra \geqq X$. If these relationships are satisfied, the occurrence of wrinkles or other types of deformation in the current collector can be reduced to thereby further restrain flaking off of the active material layer from the current collector.

The thickness X of the active material layer is not particularly specified but may preferably be up to 1,000 µm, more preferably 10 µm-100 µm.

Also in this invention, a surface of the current collector that carries the active material layer thereon preferably has a surface roughness Ra of at least 0.2 µm. The use of such a current collector having the specified surface roughness Ra increases a contact area of the active material layer and the current collector, and thus improves adhesion of the active material layer to the current collector. In addition, the binder is allowed to penetrate into recesses on a surface of the current collector. Then, an anchor effect is created between the binder and the current collector to further improve adhesion. As a result, flaking off of the active material layer from the current collector is further restrained. In the case where the active material layer is provided on both sides of the current collector, it is preferred that each side of the current collector has a surface roughness Ra of at least 0.2 µm.

Surface roughness Ra is defined in Japanese Industrial Standards (JIS B 0601-1994) and can be measured as by a surface roughness meter.

In the present invention, a surface-roughened current collector may also be used. Examples of surface roughening treatments include plating, vapor growth, etching and polishing. Plating and vapor growth are techniques which impart surface roughness by depositing an irregularly surfaced layer on a metal foil current collector. Plating includes electroplating and electroless plating. Examples of vapor growth processes include sputtering, CVD and vapor deposition. Etching may be achieved either physically or chemically. Polishing may be carried out using a sand paper or with blast.

The current collector for use in the present invention is not particularly specified, so long as it comprises an electrically conductive metal foil. Specific examples of such current collectors include metal foils composed of copper, nickel, iron, titanium, cobalt or an alloy of any combination thereof, for example. The particularly preferred metal foil contains a metal element which is readily diffusible into the active material particles. Examples of such metal foils include those containing a copper element, particularly a copper foil and a copper alloy foil. Because a heat treatment promotes diffusion of a copper element into silicon, sintering of the negative electrode is expected to improve adhesion between the current collector and the active material layer.

A metal foil which carries a copper-containing layer on its surface is also useful as the current collector. That is, a copper layer or a copper alloy layer may be deposited on a surface of a copper-free metal foil to provide a useful current collector. For example, a copper or copper alloy film may be deposited on a metal foil by an electrolytic plating technique. Specifically, a copper or copper alloy film may be deposited on a surface of a nickel foil.

In the present invention, the thickness of the current collector is not particularly specified but may preferably be in the range of 10-100 µm.

In the present invention, an upper limit of the surface roughness Ra of the current collector is not particularly specified. However, in view of the current collector thickness that is preferably in the range of 10-100 µm, it is preferred that the substantial upper limit of the surface roughness Ra of the current collector does not exceed 10 µm.

As described earlier, the binder for use in the present invention possesses the above-specified mechanical properties after completion of negative electrode fabrication. In cases where the sintering treatment is performed on the negative electrode, the binder after the sintering treatment must have the above-specified mechanical properties. Accordingly, the heat-resistant binder is preferably used with the sintering treatment. Polyimide is preferably used for such a binder. Polyimide, either thermoplastic or thermosetting, can be used. Also, polyimide can be obtained, for example, by subjecting polyamic acid to a heat treatment.

The heat treatment causes polyamic acid to undergo dehydrocondensation to produce polyimide. Preferably, such polyimide has an imidization level of at least 80%. The imidization level, as used herein, refers to a mole % of the produced polyimide relative to a polyimide precursor (polyamic acid). Polyimide with at least 80% imidization level can be obtained, for example, by subjecting an N-methylpyrrolidone (NMP) solution of polyamic acid to a heat treatment at a temperature of 100° C.-400° C. for over 1 hour. In an exemplary case where the heat treatment is carried out at 350° C., the imidization level reaches 80% in about 1 hour and 100% in about 3 hours.

The polyimide preferably has a number average molecular weight of 5,000-1,000,000, more preferably 10,000-100,000. If the number average molecular weight of the polyimide is low, its mechanical properties tend to deteriorate. On the other hand, if the number average molecular weight is high, the polyimide may become hard to handle.

In the present invention, subsequent to provision of the active material layer on a surface of the current collector, a heat treatment is preferably carried out at a temperature higher than a glass transition temperature of the binder to improve adhesion of the active material to the current collector. Where the negative electrode fabrication involves a sintering treatment, this sintering treatment can serve as the above heat treatment. Accordingly, the sintering treatment temperature is preferably higher than a glass transition temperature of the binder. The heat treatment at a temperature higher than a glass transition temperature of the binder causes the binder in the active material layer to soften and penetrate into recesses on a surface of the current collector. Then, an anchor effect is created between the binder and the current collector to further improve adhesion between the active material layer and the current collector. The sintering treatment temperature is preferably lower than a decomposition temperature of the binder.

In view of the above discussions, the glass transition temperature of the binder used is preferably lower than a temperature of the above-described sintering treatment or heat treatment, if either performed. It is generally preferred that the glass transition temperature of the binder does not exceed 450° C. More preferably, it does not exceed 350° C. If the binder is thermoplastic, the heat treatment at a temperature higher than its glass transition temperature enables thermal bonding of the binder to the current collector. As a result, a marked adhesion improvement can be achieved.

The binder preferably has a linear expansion coefficient of $0.1 \times 10^{-5}$-$30 \times 10^{-5}$ $C.^{-1}$, more preferably $0.8 \times 10^{-5}$-$10 \times 10^{-5}$ $C.^{-1}$, particularly preferably $1.0 \times 10^{-5}$-$3.5 \times 10^{-5}$ $C.^{-1}$. If the linear expansion coefficient of the binder differs largely from that of the current collector, the sintering or heat treatment creates a strain at a contact interface between the binder and the current collector and produces a stress. This tends to deteriorate adhesion therebetween. In an exemplary case where a copper foil is used as the current collector, it is preferred to use a binder having a linear expansion coefficient close to that of copper, $1.6 \times 10^{-5}$ $C.^{-1}$.

In the present invention, the amount by weight of the binder in the active material layer is preferably at least 5% of the total weight of the active material layer. Also, the volume of the binder is preferably at least 5% of the total volume of the active material layer. If the binder content of the active material layer is excessively low, insufficient adhesion may result within the electrode. On the other hand, if the binder content of the active material layer is excessively high, a resistance inside the electrode may increase to result in the difficulty to effect initial charging. Preferably, the amount by weight of the binder in the active material layer does not exceed 50% of the total weight of the active material layer, and the volume of the binder does not exceed 50% of the total volume of the active material layer.

In the present invention, an electrically conductive powder can be mixed in the active material layer. Such a conductive powder, when added, surrounds the active material particles to form an electrically conductive network, resulting in further improving the current collecting capacity within the electrode. The conductive powder may preferably be made from materials similar in type to those used for the conductive metal foil. Specific examples of useful materials include metals such as copper, nickel, iron, titanium and cobalt; alloys and mixtures of any combination thereof. A copper powder, among those metal powders, is particularly useful. The use of a conductive carbon powder is also preferred.

Preferably, the conductive powder is loaded in the amount that does not exceed 50% of the total weight of the conductive powder and active material particles. If the loading of the conductive powder is excessively high, a ratio of the active material particles to the conductive powder becomes relatively small to result in lowering a charge-discharge capacity of the electrode.

The active material particles for use in the present invention may comprise particles of silicon and/or silicon alloy. Examples of silicon alloys include solid solutions of silicon and other one or more elements, intermetallic compounds of silicon with other one or more elements and eutectic alloys of silicon and other one or more elements. Alloying can be achieved by such methods as arc melting, liquid quenching, mechanical alloying, sputtering, chemical vapor growth and calcination. Examples of liquid quenching methods include a single roller quenching method, a twin roller quenching method and various atomizing methods including gas atomizing, water atomizing and disk atomizing.

The active material particles for use in the present invention may also comprise silicon and/or silicon alloy particles with their surfaces being coated with a metal or the like. Coating can be achieved by such methods as electroless plating, electroplating, chemical reduction, vapor deposition, sputtering and chemical vapor deposition. Preferably, the coating metal is identical in type to the conductive metal foil for use as the current collector. The active material particles, if having surfaces coated with the metal identical in type to the conductive metal foil, exhibit the marked improvement in adhesion to the current collector when they are sintered. This results in obtaining further improved charge-discharge cycle performance characteristics.

The active material particles for use in the present invention may include particles composed of material that alloys with lithium. Examples of such lithium-alloying materials include germanium, tin, lead, zinc, magnesium, sodium, aluminum, gallium, indium and their alloys.

In the present invention, the mean particle diameter of the active material particles is not particularly specified but may preferably be up to 100 μm, more preferably up to 50 μm, most preferably up to 10 μm. Also, the mean particle diameter of the conductive powder useful for addition to the active material particles is not particularly specified but may preferably be up to 100 μm, more preferably up to 50 μm, most preferably up to 10 μm.

In the present invention, after provision of the active material layer on the current collector, they are preferably calendered. Preferably, calendering is performed prior to the sintering treatment or heat treatment, if either is applied to the negative electrode. This calendering increases a packing density in the active material layer and thereby enhances adhesion both between the particles and between the particles and the current collector. Therefore, a further improved charge-discharge cycle characteristics result.

The rechargeable lithium battery of the present invention is characterized as including the negative electrode of the present invention, a positive electrode containing positive electrode material, and a nonaqueous electrolyte.

A solvent of the nonaqueous electrolyte for use in the rechargeable lithium battery of the present invention is not particularly specified in type but can be illustrated by a mixed solvent of cyclic carbonate and chain carbonate. Examples of cyclic carbonates include ethylene carbonate, propylene carbonate and butylene carbonate. Examples of chain carbonates include dimethyl carbonate, methyl ethyl carbonate and diethyl carbonate. Also applicable is a mixed solvent which contains any of the above-listed cyclic carbonates and an ether solvent such as 1,2-dimethoxyethane or 1,2-diethoxyethane. A solute of the nonaqueous electrolyte can be illustrated by $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$ and mixtures thereof. Particularly preferred for use as such a solute is a mixed solute of $LiXF_y$ (wherein X is P, As, Sb, B, Bi, Al, Ga or In, and y is 6 if X is P, As or Sb or 4 if X is Bi, Al, Ga or In) either with lithium perfluoroalkylsulfonyl imide $LiN(C_mF_{2m+1}SO_2)(CnF_{2n+1}SO_2)$ (where in m and n are independently integers of 1-4) or with lithium perfluoroalkylsulfonyl methide $LiN(C_pF_{2p+1}SO_2)(C_qF_{2q+1}SO_2)(C_rF_{2r+1}SO_2)$ (wherein p, q and r are independently integers of 1-4). Among them, the use of the mixed solute of $LiPF_6$ and $LiN(C_2F_5SO_2)_2$ is particularly preferred. Other applicable electrolytes include, for example, gelled polymer electrolytes comprised of an electrolyte solution impregnated into polymer electrolytes such as polyethylene oxide and polyacrylonitrile, and inorganic solid electrolytes such as LiI and $Li_3N$. The electrolyte for the rechargeable lithium battery of the present invention can be used without limitation, so long as a lithium compound as its solute that imparts ionic conductivity, together with its solvent that dissolves and retains the lithium compound, remain undecomposed at voltages during charge, discharge and storage of the battery.

Examples of useful positive electrode materials for the rechargeable lithium battery of the present invention include lithium-containing transition metal oxides such as $LiCoO_2$, $LiNiO_2$, $LiMn_2O_4$, $LiMnO_2$, $LiCo_{0.5}Ni_{0.5}O_2$ and $LiNi_{0.7}Co_{0.2}Mn_{0.2}Mn_{0.1}O_2$; and lithium-free metal oxides such as $MnO_2$. Other substances can also be used, without limitation, if they are capable of electrochemical lithium insertion and deinsertion.

BEST MODE FOR CARRYING OUT THE INVENTION

The present invention is below described in more detail by way of Examples. The following examples merely illustrate the practice of the present invention but are not intended to be limiting thereof. Suitable changes and modifications can be effected without departing from the scope of the present invention.

EXPERIMENT 1

(Fabrication of Negative Electrode)

80.2 parts by weight of a silicon powder (99.9% pure) having a mean particle diameter of 3 μm, as active material particles, was mixed in an 8.6 wt. % N-methylpyrrolidone solution containing 19.8 parts by weight of polyamic acid (binder α1) as a binder to provide an anode mix slurry.

This anode mix slurry was coated on one surface (rough surface) of an electrolytic copper foil (35 μm thick) (current collector a1) having a surface roughness Ra of 0.5 μm, as a current collector, dried and then calendered. A 20 mm diameter disk was cut out from the coated copper foil, and then sintered by a heat treatment under argon atmosphere at 400° C. for 30 hours to provide a negative electrode. The sintered body (inclusive of the current collector) was 50 μm thick. Accordingly, the thickness of the active material layer was 15 μm, active material layer thickness/copper foil surface roughness was 30, and active material layer thickness/copper foil thickness was 0.43.

In the negative electrode, the heat treatment resulted in the production of polyimide from the polyamic acid. The polyimide content, by weight, of the active material layer was 18.2%. Polyimide was found to have a density of 1.1 g/cm3 and constitute 31.8% of the total volume of the active material layer.

The electrolytic copper foil (current collector a1) alone was subjected to a heat treatment under the same conditions as above (i.e., under argon atmosphere at 40020 C. for 30 hours) and then measured for tensile strength, proportional limit, elongation at break and elastic elongation limit. The measured values therefor are shown in Table 1. The thickness was measured by a micrometer. The tensile strength, proportional limit, elongation at break and elastic elongation limit were measured using an Instron Model-5566 universal tester. The surface roughness Ra was measured by a surface roughness meter.

TABLE 1

| Current Collector | Current Collector Type | Thickness (μm) | Tensile Strength (N/mm$^2$) | Proportional Limit (N/mm$^2$) | Elongation at Break (%) | Elastic Elongation Limit (%) | Surface Roughness Ra (μm) |
|---|---|---|---|---|---|---|---|
| a1 | Electrolytic Copper Foil | 35 | 149 | 61 | 4.7 | 0.10 | 0.5 |

The polyamic acid (binder α1) alone was subjected to a heat treatment under the same conditions as in the electrode fabrication to prepare a sample film. The sample film was measured for tensile strength, elongation at break, strain energy density, elastic modulus, glass transition temperature and linear expansion coefficient. The measured values therefor are shown in Table 2. The tensile strength, elongation at break, strain energy density and elastic modulus were measured at 25° C. using a tensile tester. The glass transition temperature was measured using a differential scanning calorimeter (DSC). The linear expansion coefficient was measured at 5° C./min over the 50-400° C. range, using a thermomechanical analyzer (TMA). In thermogravimetry (TG), a temperature at which the binder started to reduce its weight was recorded as a thermal decomposition initiating temperature.

Figure 1:
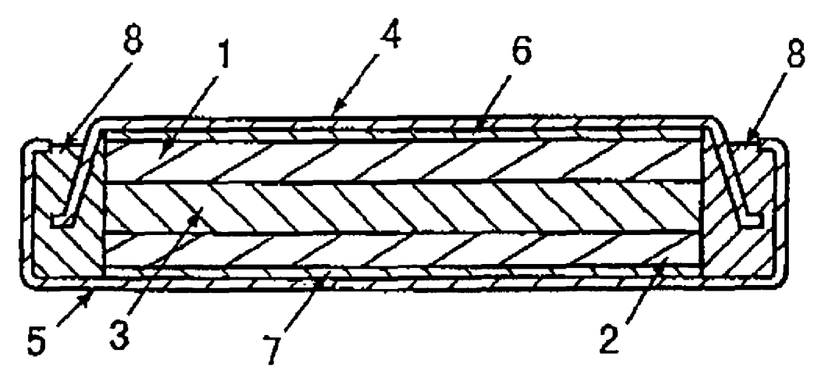
FIG. 1 is a schematic sectional view which shows the rechargeable lithium battery fabricated in the example of the present invention.

FIG. 1 is a schematic sectional view of the constructed rechargeable lithium battery including a positive electrode 1, a negative electrode 2, a separator 3, a positive can 4, a negative can 5, a positive current collector 6, a negative current collector 7 and a polypropylene insulation gasket 8.

The positive electrode 1 and the negative electrode 2 are disposed in opposite sides of the separator 3. These are housed in a battery casing defined by the positive and negative cans 4 and 5. The positive current collector 6 connects the positive electrode 1 to the positive can 4, while the negative current collector 7 connects the negative electrode 2 to the negative can 5. As such, they are assembled into a construction which can be charged and discharged as a rechargeable battery.

TABLE 2

| Binder | Binder Type (Heat Treatment Conditions) | Tensile Strength ($N/mm^2$) | Elongation at Break (%) | Strain Energy Density ($\times 10^{-2} J/mm^3$) | Elastic Modulus ($N/mm^2$) | Glass Transition Temperature (° C.) | Linear Expansion Coefficient ($\times 10^{-5}$ °$C.^{-1}$) | Thermal Decomposition Initiating Temperature (° C.) |
|---|---|---|---|---|---|---|---|---|
| α1 | Polyimide (400° C. 30 hrs.) | 200 | 103 | 19.1 | 3900 | 285 | 1.5 | 500 |

(Fabrication of Positive Electrode)

Starting materials, $Li_2CO_3$ and $COCO_3$, were weighed such that a ratio of numbers of Li and Co atoms, Li:Co, was brought to 1:1, and then mixed in a mortar. The mixture was pressed in a 17 mm diameter mold and calcined in the air at 800° C. for 24 hours to obtain a calcined product consisting of $LiCoO_2$. This product was then ground in a mortar into particles with a mean particle diameter of 20 μm.

90 parts by weight of the resulting $LiCoO_2$ powder and 5 parts by weight of artificial graphite powder as an electric conductor were added to a 5 wt. % N-methylpyrrolidone solution containing 5 parts by weight of polyvinylidene fluoride as a binder to provide a cathode mix slurry.

The cathode mix slurry was coated on an aluminum foil as a current collector, dried and then calendered. A 20 mm diameter disk was cut out from the coated aluminum foil to provide a positive electrode.

(Preparation of Electrolyte Solution)

1 mole/liter of $LiPF_6$ was dissolved in an equivolume solvent mixture of ethylene carbonate and diethyl carbonate to prepare an electrolyte solution.

(Construction of Battery)

A flat rechargeable lithium battery A1 was constructed by using the above-prepared positive electrode, negative electrode and electrolyte solution.

EXPERIMENT 2

The procedure of Experiment 1 was followed to construct battery B1, except that a 33 μm thick, rolled copper foil (surface roughness Ra: 0.1 μm) roughened at its surface by electrolytic copper plating to a surface roughness Ra of 0.5 μm (current collector b1) was used in place of the electrolytic copper foil (current collector a1) with a surface roughness Ra of 0.5 μm. After the roughening treatment, the current collector b1 was 35 μm thick. In addition, the procedure of Experiment 1 was followed to construct a battery A2, except that a 33 μm thick, rolled copper alloy (Cu-0.03 wt.% Zr) foil (surface roughness Ra: 0.1 μm) roughened at its surface by electrolytic copper plating to a surface roughness Ra of 0.5 μm. (current collector a2) was used in place of the electrolytic copper foil (current collector a1) having a surface roughness Ra of 0.5 μm. After the roughening treatment, the current collector a2 was 35 μm thick. The current collectors b1 and a1 were subjected to a heat treatment under the same conditions as in the electrode fabrication (i.e., under argon atmosphere at 400° C. for 30 hours) and then measured for thickness, tensile strength, proportional limit, elongation at break and elastic elongation limit. The measured values therefor are shown in Table 3.

TABLE 3

| Current Collector | Current Collector Type | Thickness (μm) | Tensile Strength ($N/mm^2$) | Proportional Limit ($N/mm^2$) | Elongation at Break (%) | Elastic Elongation Limit (%) | Surface Roughness Ra (μm) |
|---|---|---|---|---|---|---|---|
| a2 | Surface-Roughened Rolled Copper Alloy Foil | 35 | 300 | 164 | 2.2 | 0.149 | 0.5 |

TABLE 3-continued

| Current Collector | Current Collector Type | Thickness (μm) | Tensile Strength (N/mm²) | Proportional Limit (N/mm²) | Elongation at Break (%) | Elastic Elongation Limit (%) | Surface Roughness Ra (μm) |
|---|---|---|---|---|---|---|---|
| b 1 | Surface-Roughened Rolled Copper Foil | 35 | 74 | 26 | 4.1 | 0.026 | 0.5 |

EXPERIMENT 3

The procedure of Experiment 1 was followed to construct batteries A3 and A4, except that a 35 μm thick electrolytic copper foil (current collector a3 or a4) composed of the same material as the current collector a1 and having a surface roughness Ra of 0.2 μm or 0.17 μm was used in place of the electrolytic copper foil (current collector a1) having a surface roughness Ra of 0.5 μm.

The procedure of Experiment 1 was followed to construct batteries A5 and A6, except that a 18 μm thick electrolytic copper foil (current collector a5 or a6) composed of the same material as the current collector a1 and having a surface roughness Ra of 0.5 μm or 0.2 μm was used in place of the current collector a1.

The procedure of Experiment 1 was followed to construct a battery A7, except that the current collector a4 was used, the loading of the active material was altered and the thickness of the active material layer was increased to 95 μm.

The procedure of Experiment 1 was followed to construct a battery A8, except that the current collector a5 was used, the loading of the active material was altered and the thickness of the active material layer was increased to 55 μm.

The current collectors a3-a6 were subjected to a heat treatment under the same conditions as in the electrode fabrication (i.e., under argon atmosphere at 400° C. for 30 hours) and then measured for thickness, tensile strength, proportional limit, elongation at break and elastic elongation limit. The measured values therefor are shown in Table 4.

TABLE 4

| Current Collector | Current Collector Type | Thickness (μm) | Tensile Strength (N/mm²) | Proportional Limit (N/mm²) | Elongation at Break (%) | Elastic Elongation Limit (%) | Surface Roughness Ra (μm) |
|---|---|---|---|---|---|---|---|
| a 3 | Electrolytic Copper Foil | 35 | 149 | 60 | 4.7 | 0.10 | 0.2 |
| a 4 | Electrolytic Copper Foil | 35 | 149 | 59 | 4.6 | 0.10 | 0.17 |
| a 5 | Electrolytic Copper Foil | 18 | 152 | 62 | 4.8 | 0.11 | 0.5 |
| a 6 | Electrolytic Copper Foil | 18 | 148 | 59 | 4.7 | 0.10 | 0.2 |

(Evaluation of Charge-Discharge Cycle Characteristics)

The above-constructed batteries A1-A8 and B1 were evaluated for charge-discharge cycle characteristics. Each battery at 25° C. was charged at a current of 1 mA to 4.2 V and then discharged at a current of 1 mA to 2.75 V. This was recorded as a unit cycle of charge and discharge. The battery was cycled to determine the number of cycles after which its discharge capacity fell down to 80% of its first-cycle discharge capacity and the determined cycle number was recorded as a cycle life. The results are shown in Table5. The cycle life of each battery is indicated therein by an index when that of the battery A1 is taken as 100.

Also, the thickness of the negative electrode after the charge-discharge test was measured by a micrometer to determine the difference in thickness of the negative electrode prior to and subsequent to the charge-discharge test. The thickness of the negative electrode was given by an arithmetic mean of values measured at 5 different locations within the electrode.

TABLE 5

| Current Collector | | Electrode Thickness Before Test (μm) | Electrode Thickness After Test (μm) | Difference in Thickness of Electrode Before and After Test (μm) | Thickness of Current Collector Before Test Y (μm) | Surface Roughness of Current Collector Before Test Ra (μm) | Thickness of Active Material Layer Before Test X (μm) | X/Y | X/Ra | Cycle Life |
|---|---|---|---|---|---|---|---|---|---|---|
| A1 | a1 | 50 | 68 | 18 | 35 | 0.5 | 15 | 0.43 | 30 | 100 |
| A2 | a2 | 50 | 67 | 17 | 35 | 0.5 | 15 | 0.43 | 30 | 103 |
| A3 | a3 | 50 | 74 | 24 | 35 | 0.2 | 15 | 0.43 | 75 | 71 |
| A4 | a4 | 50 | 81 | 31 | 35 | 0.17 | 15 | 0.43 | 88.2 | 58 |
| A5 | a5 | 33 | 52 | 19 | 18 | 0.5 | 15 | 0.83 | 30 | 99 |
| A6 | a6 | 33 | 59 | 26 | 18 | 0.2 | 15 | 0.83 | 75 | 77 |
| A7 | a5 | 113 | 223 | 110 | 18 | 0.5 | 95 | 5.3 | 190 | 63 |
| A8 | a6 | 73 | 152 | 79 | 18 | 0.2 | 55 | 3.1 | 275 | 64 |
| B1 | b1 | 50 | 198 | 148 | 35 | 0.5 | 15 | 0.43 | 30 | 36 |

As apparent from Table 3, the tensile strength, proportional limit and elastic elongation limit of the current collector b1 fall outside the scope of the present invention. As shown in Table 5, the battery B1 using this current collector b1 exhibits a larger difference in thickness of the electrode prior to and subsequent to the test, compared to the batteries A1-A8 in accordance with this invention. This suggests wrinkle formation in the current collector. Also, the battery B1 shows a shorter cycle life, compared to the batteries A1-A8 in accordance with this invention. These demonstrate that the use of the current collector having mechanical properties specified in this invention prevents production of wrinkles or other types of deformation in the current collector even if subjected to a large force arising from volumetric expansion and shrinkage of the active material layer while storing and releasing lithium. Since the current collector, if maintained undeformed, causes no deformation in the active material layer, no breakage of the binder occurs in the active material layer. As a result, reduction of the current collecting capacity of the active material layer and following deterioration of charge-discharge cycle characteristics can be suppressed.

For the battery A7, the ratio X/Y of the thickness X of the active material layer to the thickness Y of the current collector exceeds 5. However, it exhibits a larger difference in thickness of the electrode prior to and subsequent to the test, compared to the batteries A1-A6. For the battery A8, the ratio X/Ra of the thickness X of the active material layer to the surface roughness Ra of the current collector exceeds 250. However, it exhibits a larger difference in thickness of the electrode prior to and subsequent to the test, compared to the batteries A1-A6, which proves wrinkle formation in the current collector. Also, this slightly deteriorates charge-discharge cycle characteristics.

EXPERIMENT 4

The procedure of Experiment 1 was followed, except that the binder β1(polyamic acid) was used in place of the binder α1, to construct a battery B2. In the negative electrode of the battery B2, the heat treatment produced polyimide from the polyamic acid. The polyimide content, by weight, in the active material layer was 18.2%.

The procedure of Experiment 1 was followed to construct a batteries A9 and A10, except that the anode mix slurry was prepared by mixing 81.8 parts by weight of silicon powder (99.9% pure) having a mean particle diameter of 3 μm, as active material particles, in an 8.6 wt.% N-methylpyrrolidone solution containing 18.2 parts by weight of thermoplastic polyimide (binder α2) or thermoplastic polyimide (binder α3). In the negative electrode for each of the batteries B2, A9 and A10, polyimide was found to have a density of 1.1g/cm³ and constitute 31.8% of the total volume of the active material layer.

For the binders β1, α2 and α3, the binder alone was subjected to a heat treatment under the same conditions as in the electrode fabrication to fabricate a sample film. In the same manner as used for the binder α1, each sample film was then measured for tensile strength, elongation at break, strain energy density, elastic modulus, glass transition temperature, linear expansion coefficient and thermal decomposition initiating temperature. The results are shown in Table 6.

TABLE 6

| Binder | Binder Type (Heat Treatment Conditions) | Tensile Strength (N/mm²) | Elongation at Break (%) | Strain Energy Density (×10⁻² J/mm³) | Elastic Modulus (N/mm²) | Glass Transition Temperature (°C.) | Linear Expansion Coefficient (×10⁻⁵ °C.⁻¹) | Thermal Decomposition Initiating Temperature (°C.) |
|---|---|---|---|---|---|---|---|---|
| β1 | Polyimide (400° C. 30 hrs.) | 440 | 26 | 9.7 | 10500 | 510 | 0.7 | 550 |
| α2 | Thermoplastic Polyimide (400° C. 30 hrs.) | 130 | 16 | 1.8 | 2800 | 295 | 5.1 | 495 |
| α3 | Thermoplastic Polyimide (400° C. 30 hrs.) | 120 | 98 | 10.6 | 2400 | 190 | 7.4 | 430 |

(Evaluation of Charge-Discharge Cycle Characteristics)

The above-constructed batteries A9, A10 and B2 were evaluated for charge-discharge cycle characteristics. Each battery at 25° C. was charged at a current of 1 mA to 4.2 V and then discharged at a current of 1 mA to 2.75 V. This was recorded as a unit cycle of charge and discharge. The battery was cycled to determine the number of cycles after which its discharge capacity fell down to 80% of its first-cycle discharge capacity and the determined cycle number was recorded as a cycle life. The results are shown in Table 7. The cycle life of each battery is indicated therein by an index when that of the battery A1 in Experiment 1 is taken as 100.

TABLE 7

| Battery | Binder | Cycle Life |
|---|---|---|
| A 1 | α1 | 100 |
| A 9 | α2 | 95 |
| A 10 | α3 | 93 |
| B 2 | β1 | 35 |

As shown in Table 6, the elastic modulus of the binder β1 was outside the scope of the present invention. As shown in Table 7, the battery B2 using this binder β1 shows a shorter cycle life, compared to the batteries A1, A9 and A10, and is thus proved to have inferior charge-discharge cycle performance characteristics. This demonstrates that the binder having mechanical properties specified in this invention is prevented from breaking when the active material particles expand and shrink in volume and thereby suppresses an increase of contact resistance between the active material particles, restrains flaking off of the active material layer from the current collector, suppresses a drop of current collecting capacity within the electrode and, as a result, improves charge-discharge cycling.

EXPERIMENT 5

In this Experiment, the influence of the sintering treatment temperature in the electrode fabrication on cycle characteristics was studied.

81.8 parts by weight of a silicon powder (99.9% pure) having a mean particle diameter of 3 μm, as the active material particles, was mixed in an 8.6 wt. % N-methylpyrrolidone solution containing 18.2 parts by weight of thermoplastic polyimide (binder α2) having a glass transition temperature of 295° C., as the binder, to prepare an anode mix slurry. The procedure of Experiment 1 was followed, except that the above-prepared anode mix slurry was used and the heat treatment of the electrode was carried out at 230° C. for 30 hours, to construct a battery A11. Also, the procedure of Experiment 1 was followed, except that the heat treatment of the electrode was carried out at 700° C. for 10 hours, to construct a battery B3.

Cycle characteristics of these batteries were evaluated in the same manner as described above. The cycle life of each battery is indicated by an index when that of the battery A1 in Experiment 1 is taken as 100. In Table 8, the respective cycle lives of the batteries A1 and A9 are also shown.

TABLE 8

| Battery | Binder Type (Glass Transition Temperature) | Sintering Treatment Temperature | Cycle Life |
|---|---|---|---|
| A 1 | α1 (285° C.) | 400° C. | 100 |
| A 9 | α2 (295° C.) | 400° C. | 95 |
| A 11 | α2 (295° C.) | 230° C. | 57 |
| B 3 | α1 (285° C.) | 700° C. | 33 |

As shown in Table 8, the batteries A1 and A9 each including a negative electrode sintered at a temperature higher than the glass transition temperature of the binder exhibit improved charge-discharge cycle characteristics, compared to the battery A11 including a negative electrode sintered at a temperature lower than the glass transition temperature of the binder. This is believed due to the heat treatment which, when carried out at a temperature higher than the glass transition temperature of each binder, causes the binder to be thermally bonded to the current collector, improves adhesion between the binder and the current collector and accordingly restrains the active material layer from flaking off from the current collector.

The battery B3 including a negative electrode sintered at 700° C., which the temperature is higher than the decomposition temperature 500° C. of the binder α1, shows marked deterioration of charge-discharge cycle characteristics. This is believed due to the heat treatment which, when carried out at 700° C., causes the binder to decompose and markedly reduce its contribution to adhesion between components within the electrode, and lowers a current collecting capacity.

The binder α2 was heat treated under the same conditions (230° C., 30 hours) as in the sintering treatment for the battery A11, and then measured for mechanical properties. The results are shown in Table 9. Also, the binder α1 was heat treated under the same conditions (700° C., 30 hours) as in the sintering treatment for the battery B3. This heat treatment however caused decomposition of the binder to render its mechanical properties unmeasurable.

TABLE 9

| Binder | Binder Type (Heat Treatment Conditions) | Tensile Strength (N/mm$^2$) | Elongation at Break (%) | Strain Energy Density (×10$^{-2}$ J/mm$^3$) | Elastic Modulus (N/mm$^2$) | Glass Transition Temperature (° C.) | Linear Expansion Coefficient (×10$^{-5}$ ° C.$^{-1}$) |
|---|---|---|---|---|---|---|---|
| α 2 | Thermoplastic Polyimide (230° C. 30 hrs.) | 130 | 16 | 1.8 | 2800 | 295 | 5.1 |

EXPERIMENT 6

In this Experiment, the influence of the electrically conductive powder added to the active material layer on cycle characteristics was studied.

The procedure of Experiment 1 was followed, except that a silver powder having a mean particle diameter of 3 μm was added in the amount of 20% of the total weight of the silver powder and the silicon powder, to construct a battery A12.

Cycle characteristics of this battery was evaluated in the same manner as described above. Its cycle life is indicated by an index when that of the battery A1 is taken as 100. In Table 10, the cycle life of the battery A1 is also shown.

TABLE 10

| Battery | Added Conductive Powder | Cycle Life |
| --- | --- | --- |
| A 1 | Absent | 100 |
| A 12 | Silver Powder | 102 |

As can be clearly seen from Table 10, the battery A12 with the silver powder shows improved cycle characteristics compared to the battery A1 without the conductive powder. This is most probably because the conductive powder formed a conductive network surrounding the active material particles and, as a result, improved the current collecting capacity within the active material layer.

EXPERIMENT 7

In this Experiment, the influence of a particle diameter of the silicon powder on cycle characteristics was studied.

The procedure of Experiment 1 was followed, except that a silicon powder having a mean particle diameter of 8 μm or 29 μm was used, to construct batteries A13 and A14.

Cycle characteristics of these batteries were evaluated in the same manner as described above. Their cycle lives are indicated by an index when that of the battery A1 is taken as 100. In Table 11, the cycle life of the battery A1 is also shown.

TABLE 11

| Battery | Mean Particle Diameter of Silicon Powder (μm) | Cycle Life |
| --- | --- | --- |
| A 1 | 3 | 100 |
| A 13 | 8 | 72 |
| A 14 | 29 | 56 |

As can be clearly seen from Table 10, the use of a silicon powder having a larger particle diameter tends to deteriorate cycle characteristics. The use of a silicon powder having a particle diameter of up to 10 μm is particularly preferred.

EXPERIMENT 8

(Fabrication of Negative Electrode)

81.8 parts by weight of a silicon powder (99.9% pure) having a mean particle diameter of 3 μm, as active material, was mixed in an 8.6 wt. % N-methylpyrrolidone solution containing 18.2 parts by weight of thermoplastic polyimide (binder α4, glass transition temperature: 148° C.) as a binder to provide an anode mix slurry.

An electrolytic copper foil (35 μm thick) having a surface roughness Ra of 0.5 μm was subjected to a heat treatment under argon atmosphere at 400° C. for 10 hours to provide a current collector a7.

The anode mix slurry was coated on one surface (rough surface) of the current collector a7, dried and then calendered. A 20 mm diameter disk was cut out from the resultant. For the purpose of improving adhesion of the active material layer to the current collector by the binder, the disk was heat treated under argon atmosphere at 170° C. for 20 hours. As a result, a negative electrode was fabricated. A thickness of the negative electrode (inclusive of the current collector) was 50 μm thick. Accordingly, the active material layer was 15 μm thick, active material layer thickness/copper foil surface roughness was 30, and active material layer thickness/copper foil thickness was 0.43. Also, polyimide was found to have a density of 1.1 g/cm$^3$ and constitute 31.8% of the total volume of the active material layer containing the polyimide.

The current collector a7 was further subjected to a heat treatment at 170° C. for 20 hours and then measured for thickness, tensile strength, proportional limit, elongation at break, elastic elongation limit and surface roughness Ra. The measured values therefor are shown in Table 12.

TABLE 12

| Current Collector | Heat Treatment | Current Collector Type | Tickness (μm) | Tensile Strength (N/mm$^2$) | Proportional Limit (N/mm$^2$) | Elongation at Break (%) | Elastic Elongation Limit (%) | Surface Roughness Ra (μm) |
| --- | --- | --- | --- | --- | --- | --- | --- | --- |
| a 7 | 400° C. 10 hrs. + 170° C. 20 hrs. | Electrolytic Copper Foil | 35 | 149 | 61 | 4.7 | 0.10 | 0.5 |

As can be seen from Table 12, the current collector a7 after the heat treatment possesses the mechanical properties specified in the present invention.

EXPERIMENT 9

In Experiment 8, the electrolytic copper foil used in the fabrication of the current collector a7 was not subjected to the heat treatment at 400° C. for 10 hours. The procedure of Experiment 8 was then followed, except that this untreated copper foil (current collector b2) was used in place of the current collector a7, to construct a battery B5. The current collector b2 was subjected to a heat treatment under argon atmosphere at 170° C. for 20 hours and then measured for thickness, tensile strength, proportional limit, elongation at break, elastic elongation limit and surface roughness Ra. The measured values therefor are shown in Table 13.

TABLE 13

| Current Collector | Heat Treatment | Current Collector Type | Thickness (μm) | Tensile Strength (N/mm$^2$) | Proportional Limit (N/mm$^2$) | Elongation at Break (%) | Elastic Elongation Limit (%) | Surface Roughness Ra (μm) |
|---|---|---|---|---|---|---|---|---|
| b 2 | 170° C. 20 hrs. | Electrolytic CopperFoil | 35 | 190 | 59 | 0.9 | 0.08 | 0.5 |

As can be seen from Table 13, the current collector b2 exhibits an elongation at break that falls outside the scope of the present invention.

EXPERIMENT 10

A33 μm thick, rolled copper alloy (Cu-0.03 wt. % Zr) foil (surface roughness Ra: 0.1 μm) was roughened at its surface by electrolytic copper plating to a surface roughness Ra of 0.5 μm, and then heat treated under argon atmosphere at 400° C. for 10 hours. The procedure of Experiment 8 was then followed, except that this treated copper alloy foil (current collector a8) was used in place of the current collector a7, to construct a battery A16. The current collector a8 after the surface roughening treatment was 35 μm thick. The current collector a8 was further subjected to a heat treatment at 170° C. for 20 hours and then measured for thickness, tensile strength, proportional limit, elongation at break, elastic elongation limit and surface roughness Ra. The measured values therefor are shown in Table 14.

TABLE 14

| Current Collector | Heat Treatment | Current Collector Type | Thickness (μm) | Tensile Strength (N/mm$^2$) | Proportional Limit (N/mm$^2$) | Elongation at Break (%) | Elastic Elongation Limit (%) | Surface Roughness Ra (μm) |
|---|---|---|---|---|---|---|---|---|
| a 8 | 400° C. 10 hrs. + 170° C. 20 hrs. | Surface-Roughened Copper Alloy Foil | 35 | 314 | 164 | 2.2 | 0.15 | 0.5 |

As can be seen from Table 14, the current collector a8 possesses the mechanical properties specified in the present invention.

The above-described procedure was followed to measure charge-discharge cycle characteristics for the batteries B5 and A16. The results are shown in Table 15.

TABLE 15

| Battery | Current Collector | Cycle Life |
|---|---|---|
| A 15 | a 7 | 100 |
| A 16 | a 8 | 108 |
| B 5 | b 2 | 35 |

As shown in Table 15, the battery B5 with the current collector b2 having mechanical properties outside the scope of the present invention shows poor cycle characteristics. This demonstrates that the current collector having the mechanical properties specified in the present invention, if subjected to a large stress arising from volumetric expansion and shrinkage of the active material particles while storing and releasing lithium, can relax the stress to thereby restrain flaking off of the active material layer from the current collector.

EXPERIMENT 11

An electrolytic copper foil composed of the same material as the current collector a7 and having a surface roughness Ra of 0.2 μm was heat treated under argon atmosphere at 400° C. for 10 hours to prepare a current collector (current collector a9). Also, an electrolytic copper foil composed of the same material as the current collector a7 and having a surface roughness Ra of 0.17 μm was heat treated under argon atmosphere at 400° C. for 10 hours to prepare a current collector (current collector a10). The procedure of Experiment 8 was followed, except that the electrolytic copper foil (current collector a7) having a surface roughness Ra of 0.2 μm was replaced by the current collector a9 or a10, to construct batteries A17 and A18. The current collectors a9 and a10 were further subjected to a heat treatment at 170° C. for 20 hours and then measured for thickness, tensile strength, proportional limit, elongation at break, elastic elongation limit and surface roughness Ra. The measured values therefor are shown in Table 16.

TABLE 16

| Current Collector | Heat Treatment | Current Collector Type | Thickness (μm) | Tensile Strength (N/mm²) | Proportional Limit (N/mm²) | Elongation at Break (%) | Elastic Elongation Limit (%) | Surface Roughness Ra (μm) |
|---|---|---|---|---|---|---|---|---|
| a 9 | 400° C. 10 hrs. + 170° C. 20 hrs. | Electrolytic CopperFoil | 35 | 146 | 60 | 4.8 | 0.10 | 0.2 |
| a 10 | 400° C. 10 hrs. + 170° C. 20 hrs. | Electrolytic CopperFoil | 35 | 144 | 60 | 4.6 | 0.10 | 0.17 |

As can be seen from Table 16, the current collectors a9 and a10 both possess the mechanical properties specified in the present invention.

Cycle characteristics of these batteries were evaluated in the same manner as described above. The cycle life of each battery is indicated by an index when that of the battery A15 is taken as 100. In Table 17, the cycle life of the battery A15 is also shown.

TABLE 17

| Battery | Current Collector | Cycle Life |
|---|---|---|
| A 15 | a 7 | 100 |
| A 17 | a 9 | 77 |
| A 18 | a 10 | 55 |

As shown in Table 17, with the use of current collectors a9 and a10 each having the mechanical properties specified in the present invention, the respective batteries A17 and A18 exhibit satisfactory cycle characteristics.

EXPERIMENT 12

In this Experiment, the influence of adhesion of the binder to the current collector on cycle characteristics was studied.

The procedure of Experiment 8 was followed, except that after coating of the anode mix slurry, the heat treatment of the electrode was not carried out, to construct a battery A19. Also, the procedure of Experiment 8 was followed, except that thermoplastic polyimide (binder α5) having a glass transition temperature of 355° C. was used in place of the binder α4, to construct a battery A20.

The adhesive force of each polyimide binder to the current collector was examined. An 8.6 wt. % N-methylpyrrolidone solution containing 18.2 parts by weight of the binder α4 or α5 was coated on the current collector a7 and then dried to obtain a laminate. The laminate using the binder α4 was further heat treated at 170° C. for 20 hours to fabricate a laminate Z1, or left untreated to fabricate a laminate Z2. The laminate using the binder α5 was further heat treated at 170° C. for 20 hours to fabricate a laminate Z3. The thickness of each laminate (inclusive of the current collector) was observed as being 50 μm. Accordingly, the polyimide layer was 15 μm thick. Using the obtained laminates, peel strength was measured according to JIS C 6481. The results are shown in Table 18.

TABLE 18

| Laminate | Binder (Glass Transition Temperature) | Heat Treatment Conditions | Peel Strength (×10³ N/m) |
|---|---|---|---|
| Z 1 | α4 (148° C.) | 170° C. 20 hrs. | 2.5 |
| Z 2 | α4 (148° C.) | Absent | 1.3 |
| Z 3 | α5 (355° C.) | 170° C. 20 hrs. | 1.2 |

As can be clearly seen from Table 18, the heat treatment of the binder at a temperature higher than its glass transition temperature results in a marked improvement of its adhesion to the copper foil.

The binders α4 and α5, after treated under the above-specified heat treatment conditions, were measured for mechanical properties. The measurement results are listed in Table 19.

TABLE 19

| Binder | Heat Treatment Conditions | Tensile Strength (N/mm²) | Elongation at Break (%) | Strain Energy Density (×10⁻² J/mm³) | Elastic Modulus (N/mm²) | Linear Expansion Coefficient (×10⁻⁵° C.⁻¹) | Thermal Decomposition Initiating Temperature (° C.) |
|---|---|---|---|---|---|---|---|
| α 4 | 170° C. 20 hrs. | 130 | 95 | 10.4 | 2700 | 6.8 | 287 |
| α 4 | Absent | 130 | 95 | 10.4 | 2700 | 6.8 | 287 |
| α 5 | 170° C. 20 hrs. | 180 | 56 | 11.3 | 3700 | 2.6 | 490 |

Cycle characteristics of the batteries A19 and A20 were evaluated in the same manner as described above. The cycle life of each battery is indicated by an index when that of the battery A15 is taken as 100. In Table 20, the cycle life of the battery A15 is also shown.

TABLE 20

| Battery | Binder | Glass Transition Temperature of Binder (° C.) | Electrode Heat Treatment Conditions | Cycle Life |
|---|---|---|---|---|
| A 15 | α4 | 148 | 170° C. 20 hrs. | 100 |
| A 19 | α4 | 148 | Absent | 51 |
| A 20 | α5 | 355 | 170° C. 20 hrs. | 47 |

As can be seen from Table 20, the battery A15 including the electrode heat treated at a temperature higher than the glass transition temperature of the binder therein exhibits the improved charge-discharge cycle characteristics, compared to the battery A19 without the heat treatment and the battery A20 including the electrode heat treated at a temperature lower than the glass transition temperature of the binder therein. This is believed due to the heat treatment which, when carried out at a temperature higher than the glass transition temperature of the binder, improves adhesion between the binder and the current collector and accordingly restrains the active material layer from flaking off from the current collector.

COMPARATIVE EXAMPLE

For a comparative purpose, the influence of mechanical properties of the binder on cycle life was studied for electrodes which use natural graphite for the negative active material.

The procedure of Experiment 1 was followed, except that a natural graphite powder having a mean particle diameter of 18 μm was used as the active material particles of the negative electrode, to construct a battery C1. Also, in the construction of the batteries B2, A9 and A10 in Experiment 4, a natural graphite powder having a mean particle diameter of 18 μm was used as the active material particles of the negative electrode. Otherwise, the procedure was followed to construct batteries C2, C3 and C4.

Cycle characteristics of these batteries were evaluated in the same manner as described above. The cycle life of each battery is indicated by an index when that of the battery C1 is taken as 100. The results are shown in Table 21.

TABLE 21

| Battery | Cycle Life |
|---|---|
| C 1 | 100 |
| C 2 | 98 |
| C 3 | 99 |
| C 4 | 99 |

As can be clearly seen from Table 21, when the natural graphite is used as the negative active material, cycle life differences arising from differences in mechanical properties of the binders are little appreciated. This is believed due to the volume expansion coefficient of natural graphite as it stores lithium, which is much lower than that of silicon and thus prevents breakage of the binder during a charge-discharge reaction even if the binder does not satisfy the mechanical properties specified in the present invention, so that the current collecting capacity between electrodes can be retained.

Utility In Industry

The present invention can provide a negative electrode for a rechargeable lithium battery, which restrains an active material layer from flaking off from a current collector during charge and discharge and thus improves charge-discharge cycle performance characteristics of the rechargeable lithium battery.

The invention claimed is:

1. A negative electrode for a rechargeable lithium battery which includes a conductive metal foil current collector and an active material layer provided on a surface of the current collector and comprising a polyimide binder and particles of active material containing silicon and/or a silicon alloy;

said negative electrode characterized in that said current collector has mechanical properties of at least 80 N/mm$^2$ tensile strength, at least 30 N/mm$^2$ proportional limit, at least 1.0% elongation at break and at least 0.03% elastic elongation limit and said binder has mechanical properties of at least 50 N/mm$^2$ tensile strength, at least 10% elongation at break, at least 2.5 ×10$^{-3}$ J/mm$^3$ strain energy density and up to 10,000 N/mm$^2$ elastic modulus; after provision of said active material layer on the surface of said current collector, heat treatment being carried out at a temperature higher than a glass transition temperature and lower than a decomposition temperature of said binder to improve adhesion of the binder to the current collector.

2. The negative electrode for a rechargeable lithium battery as recited in claim 1, characterized in that said mechanical properties are imparted to the current collector by a thermal history of the sintering treatment.

3. The negative electrode for a rechargeable lithium battery as recited in claim 1, characterized in that said mechanical properties are imparted to said current collector by subjecting the current collector to a heat treatment before said active material layer is provided on the surface of the current collector.

4. The negative electrode for a rechargeable lithium battery as recited in claim 1, characterized in that a thickness X of said active material layer, a thickness Y and a surface roughness Ra of said current collector satisfy the relationships 5Y≧X and 250Ra≧X.

5. The negative electrode for a rechargeable lithium battery as recited in claim 1, characterized in that said surface of the current collector that carries the active material layer thereon has a surface roughness Ra of at least 0.2 μm.

6. The negative electrode for a rechargeable lithium battery as recited in claim 1, characterized in that said current collector comprises a copper foil, a copper alloy foil or a metal foil having a copper or copper alloy surface layer.

7. The negative electrode for a rechargeable lithium battery as recited in claim 1, characterized in that said current collector comprises an electrolytic copper foil, an electrolytic copper alloy foil or a metal foil having an electrolytic copper or copper alloy surface layer.

8. The negative electrode for a rechargeable lithium battery as recited in claim 1, characterized in that said binder has said mechanical properties after a thermal history of said heat treatment.

9. The negative electrode for a rechargeable lithium battery as recited in claim 1, characterized in that said binder has a linear expansion coefficient of $0.1 \times 10^{-5} - 30 \times 10^{-5}\ °C^{-2}$.

10. The negative electrode for a rechargeable lithium battery as recited in claim 1, characterized in that said binder has a glass transition temperature of up to 450° C.

11. The negative electrode for a rechargeable lithium battery as recited in claim 1, characterized in that said active material particles have a mean particle diameter of up to 10 μm.

12. The negative electrode for a rechargeable lithium battery as recited in claim 1, characterized in that said active material layer includes a conductive powder.

13. A rechargeable lithium battery including the negative electrode as recited in claim 1, a positive electrode containing a positive electrode material and a nonaqueous electrolyte.

* * * * *